United States Patent Office 3,657,365
Patented Apr. 18, 1972

3,657,365
PROCESS FOR THE MANUFACTURE OF METHYL OR ETHYL CHLORIDE FROM METHYL OR ETHYL ACETATE
Hans Fernholz, Fischbach, Taunus, and Heinz Wendt, Sulzbach, Taunus, Germany, assignors to Farbwerke Hoechst Aktiengesellschaft vormals Meister Lucius & Bruning, Frankfurt am Main, Germany
No Drawing. Filed Apr. 13, 1970, Ser. No. 28,151
Claims priority, application Germany, Apr. 18, 1969, P 19 19 725.2
Int. Cl. C07c *19/02*
U.S. Cl. 260—652 R
4 Claims

ABSTRACT OF THE DISCLOSURE

The subject of the invention is a process for the manufacture of methyl or ethyl chloride from methyl or ethyl acetate by a reaction with hydrogen chloride in the vapor phase at temperatures within the range of from 120° to 360° C. and under pressures of from 0 to 20 atmospheres gauge, using as catalyst technically pure silicic acid which was impregnated with from 5 to 15% by weight of zinc chloride. The silicic acid should have a specific surface of from 20 to 800 m.$^2$ per gram and an average pore diameter of from 5 to 2,000 A.

---

The present invention relates to a process for the manufacture of methyl or ethyl chloride from methyl or ethyl acetate.

In various technical processes which are based on the ester-interchange of an organic acetate with methanol or ethanol, methyl or ethyl acetate are obtained as by-products. The preparation of polyvinyl alcohol by ester-interchange of polyvinyl acetate with methanol stands for an example. The amounts of methyl acetate thus obtained are by far in excess of what is needed of this product. Therefore, it had already been known how to convert methyl acetate, particularly in the form of a mixture with methanol obtained in a technical process, into methyl chloride by reaction with hydrogen chloride, in which process the recovering of the acetic acid simultaneously obtained in this reaction is of special importance in industry. Processes of this kind which are based on mixtures of methyl acetate/methanol or ethyl acetate/ethanol have important drawbacks, as the alcohol contained in the acetate is at least partially esterified in the reaction with hydrogen chloride which results in the formation of water. This involves the loss of the hydrogen chloride in excess in the form of aqueous hydrochloric acid, as well as a very complicated working up of the reaction product which consists, for example, of methyl chloride, non-reacted methyl acetate, methanol, acetic acid, hydrochloric acid, and water.

It is known that ester-interchanges of alkyl esters of aliphatic or aromatic acids with hydrogen chloride to form alkyl chlorides can be effected in such a way that the alkyl esters, which can be distilled without decomposition, are passed, together with hydrogen chloride, over surface-active catalysts containing activating metal salts, in vapour state at elevated temperatures and under normal or elevated pressure. Particularly suitable catalysts are active carbon, pumice, bleaching earth and aluminum oxide.

As could be seen, however, the ester-interchange of methyl or ethyl acetate with hydrogen chloride in the gaseous phase depends to a surprisingly great extent on the chemical nature and the physical properties of the respective catalyst in such a way that the catalysts mentioned above are inappropriate particularly for the ester-interchange of methyl or ethyl acetate, as their activity, selectivity and durability are insufficient for this purpose.

The present invention provides a process for the preparation of methyl or ethyl chloride from methyl or ethyl acetate by way of reaction with hydrogen chloride in the gaseous phase, in which process methyl or ethyl acetate and hydrogen chloride are passed in the vapor phase at temperatures within the range of from 120° to 360° C. and under pressures of from 0 to 20 atmospheres gauge, over technically pure silicic acid containing from 5 to 15% by weight of chloride of zinc and having a specific surface of from 20 to 800 m.$^2$/gram and an average pore diameter of from 5 to 2,000 A.

As the starting product for the process in accordance with the invention, methyl or ethyl acetate is advantageously chosen which is obtained by means of separation of the alcohol according to known methods, and which contains up to 2% by weight at most of alcohol and water, thus preventing the loss of the hydrogen chloride mentioned above and avoiding the complicated working-up.

In comparison to the known catalysts, the catalysts of the invention show a surprisingly high activity, selectivity and durability for the ester-interchange of methyl or ethyl acetate.

A catalyst of this kind is prepared by impregnating chemically pure silicic acid, which may be present in the form of granules, balls, little rods or in another form, with an aqueous solution of chloride of zinc and by subsequent drying until it is practically free from water.

By elevated temperatures there are to be understood temperatures within the range of from 120° to 360° C., while elevated pressures are pressures of up to 20 atmospheres gauge. Naturally, the process may also be effected under pressures other than those mentioned above, which, however, does not show any advantage.

It has also been found, that the small amounts of water and methanol or ethanol still present in the technically pure methyl or ethyl acetate can advantageously be eliminated with the aid of acetyl chloride. The process of the invention is therefore carried out in such a manner that acetyl chloride is added to the acetate in an amount corresponding to its water and alcohol content, by which process the water and the alcohol are transformed into acetic acid or alkyl acetate and hydrogen chloride.

The hydrogen chloride required for the process of the invention is practically anhydrous. As an excess of hydrogen chloride does not involve a considerably improved conversion, acetate and hydrogen chloride are advantageously reacted in an approximately equimolar ratio.

The process of the invention can be effected on firmly placed catalysts, as well as in a fluidized bed. The reaction product which consists of methyl or ethyl chloride, methyl or ethyl acetate, acetic acid, and of a small amount of hydrogen chloride, can easily be worked up by distillation. For shifting of the boiling point it is advantageous to work under elevated pressure. Non-reacted methyl or ethyl acetate and hydrogen chloride are led back into the reactor. The average conversion rates are about 76% and the yields of methyl or ethyl chloride and of acetic acid are 98% or 99% on an average, calculated on the reacted acetate. Special advantages of the process in accordance with the invention in comparison with the processes already known are the practically unlimited durability of the catalyst and the simple working-up of the reaction product which allows a practically complete recovering of the pure acetic acid.

The following examples serve to illustrate the invention.

EXAMPLE 1 (COMPARATIVE EXAMPLE)

A mixture of 0.6 mole of ethyl acetate and 0.5 mole of hydrogen chloride was passed per hour at 270° C.

over 200 milliliters of a carbon catalyst which contained 10% by weight of zinc chloride. The reaction product was condensated and analysed. In the first hour the extent of conversion was 76%. It was reduced within 6 hours to less thn 15%. The waste gas contained ethylene as decomposition product.

Similar results were obtained with bleaching earth and pumice stone as catalysts.

EXAMPLE 2 (COMPARATIVE EXAMPLE)

As in Example 1, 1 mole each of methyl acetate and of hydrogen chloride was passed per hour at about 310° C. over 200 milliliters of aluminum oxide with 5% each of aluminum chloride and copper (II)-chloride. At first the extent of conversion of the methyl acetate was 29.6%. It was reduced within a short time.

EXAMPLE 3

A silicic acid charged with about 10% by weight of $ZnCl_2$ which had a specific surface of about 120 m.$^2$/grams and a pore diameter of about 500 A. was used as catalyst. 1 mole each of methyl acetate and of hydrogen chloride was passed per hour at about 250° C. over 200 milliliters of this catalyst. The extent of conversion of methyl acetate was about 75%. The yield of methyl chloride was about 98.5% and that of acetic acid about 99%, calculated on the reacted methyl acetate. The activity of the catalyst showed a constant efficiency: after a test period of about 2,000 hours, no reduction of efficiency could be observed.

EXAMPLE 4

When working under the conditions of Example 3 with a silicic acid charged with about 10% by weight of $ZnCl_2$ which had a specific surface of about 760 m.$^2$/grams and a pore diameter of about 5 A., the extent of conversion of methyl acetate was about 73%. The yield of methyl chloride was 98% and that of acetic acid was 98.8%, calculated on the reacted methyl acetate.

EXAMPLE 5

When working under the conditions of Example 1 with a silicic acid charged with about 10% by weight of $ZnCl_2$ which had a specific surface of about 24 m.$^2$/grams and a pore diameter of about 1,960 A., the extent of conversion of methyl acetate was about 71%. The yield of methyl chloride was about 98.3% and that of acetic acid was about 99%, calculated on the reacted methyl acetate.

EXAMPLE 6

A silicic acid charged with about 10% by weight of $ZnCl_2$ which had a specific surface of about 120 m.$^2$/grams and a pore diameter of about 500 A. was used as catalyst. 1 mole each of ethyl acetate and of hydrogen chloride was passed per hour at a temperature within the range of from 240° to 250° C. over the said catalyst. The extent of conversion of ethyl acetate was about 87%. The yield of ethyl chloride was about 98.5% and that of acetic acid was about 99%, calculated on the reacted ethyl acetate. There was hardly any ethylene obtained. No reduction of efficiency could be observed.

EXAMPLE 7

If, in accordance with Example 3, 1 mole of methyl acetate which contained 1% by weight (about 1 gram) of water and to which 4.36 grams of acetyl chloride were added, was reacted with 1 mole of hydrogen chloride, methyl acetate was converted to an extent of about 76%. The yield of methyl chloride was about 98% and that of acetic acid of about 99%, calculated on the reacted methyl acetate. The water content of the reaction product was below 0.01%.

EXAMPLE 8

9.4 moles of gaseous ethyl acetate and 9.4 moles of hydrogen chloride were passed per hour at a pressure of 8 atmospheres gauge and at a temperature of 200° C. over a catalyst corresponding to the one described in Example 6. The reaction product leaving the reactor was condensated and analysed upon release. Ethyl acetate was converted to an extent of about 78%. The yield of ethyl chloride was about 98% and that of acetic acid was about 99%, calculated on the reacted ethyl acetate.

EXAMPLE 9

9.4 moles of gaseous methyl acetate and 9.4 moles of hydrogen chloride were passed per hour at a pressure of 8 atmospheres gauge and at a temperature of 250° C. over the catalyst described in Example 3. Methyl acetate was converted to an extent of about 76%. The yields of methyl acetate and of acetic acid were about 98%, calculated on the reacted methyl acetate.

What we claim is:

1. A process for the manufacture of methyl or ethyl chloride from methyl or ethyl acetate by means of a reaction with hydrogen chloride in the gaseous phase, in which process methyl or ethyl acetate and hydrogen chloride are passed in the vapour phase at temperatures within the range from 120° to 360° C. and under pressure from 0 to 20 atmospheres gauge over pure silicic acid containing from 5 to 15% by weight of zinc chloride and having a specific surface of from 20 to 800 m.$^2$/grams, as well as an average pore diameter of from 5 to 2,000A.

2. A process as claimed in claim 1, wherein the methyl or ethyl acetate used contains up to 2% by weight at most of alcohol and water.

3. A process as claimed in claim 1, wherein an amount of acetyl chloride is added to the methyl or ethyl acetate which corresponds to the content of methanol or ethanol and water.

4. A process as claimed in claim 1, wherein methyl or ethyl acetate and hydrogen chloride are used in an equimolar ratio.

References Cited
FOREIGN PATENTS

| | | | |
|---|---|---|---|
| 686,849 | 1/1940 | Germany | 260—652 R |
| 1,100,561 | 1/1968 | Great Britain | 260—652 R |

HOWARD T. MARS, Primary Examiner

U.S. Cl. X.R.

252—457; 260—652 P